(12) United States Patent
Mertala et al.

(10) Patent No.: US 9,517,920 B2
(45) Date of Patent: Dec. 13, 2016

(54) ELEVATOR PROVIDED WITH A GUIDE SHOE ARRANGEMENT

(71) Applicants: Antti Mertala, Hyvinkaa (FI); Heidi Sederholm, Helsinki (FI)

(72) Inventors: Antti Mertala, Hyvinkaa (FI); Heidi Sederholm, Helsinki (FI)

(73) Assignee: Kone Corporation, Hensinki (FI)

( * ) Notice: Subject to any disclaimer, the term of this patent is extended or adjusted under 35 U.S.C. 154(b) by 429 days.

(21) Appl. No.: 14/033,787

(22) Filed: Sep. 23, 2013

(65) Prior Publication Data
US 2014/0020987 A1 Jan. 23, 2014

Related U.S. Application Data

(63) Continuation of application No. PCT/FI2012/050258, filed on Mar. 19, 2012.

(30) Foreign Application Priority Data

Mar. 30, 2011 (FI) ...................................... 20110118

(51) Int. Cl.
*B66B 7/04* (2006.01)
*F16B 21/06* (2006.01)

(52) U.S. Cl.
CPC ............... *B66B 7/046* (2013.01); *F16B 21/06* (2013.01)

(58) Field of Classification Search
CPC ............ B66B 7/04; B66B 7/046; B66B 7/047; B66B 7/042; B66B 7/048; F16B 21/06; F16B 5/0016; F16B 5/0614
See application file for complete search history.

(56) References Cited

U.S. PATENT DOCUMENTS

| 1,854,976 A | 4/1932 | Brady |
| 2,057,118 A | 10/1936 | Sanford |

(Continued)

FOREIGN PATENT DOCUMENTS

| DE | 1208854 B | 1/1966 |
| WO | WO-2005014459 A2 | 2/2005 |

OTHER PUBLICATIONS

International Search Report PCT/ISA/210 for PCT/FI2012/050258 dated Jun. 21, 2012.

(Continued)

*Primary Examiner* — Minh Truong
(74) *Attorney, Agent, or Firm* — Harness, Dickey & Pierce, P.L.C.

(57) ABSTRACT

The object of the invention is an elevator provided with a guide shoe arrangement, which elevator comprises at least an elevator car, which is configured to travel in the elevator hoistway guided by guide rails, and which elevator comprises at least one guide shoe element, which comprises at least a body part moving along with the elevator car and also a plurality of guide rolls supported on the body part, each of which guide rolls is configured to travel while supported on one guide surface of a guide rail when the elevator car moves. At least one of the aforementioned guide rolls is supported in a manner allowing rotation on a support part that is separate from the other aforementioned guide rolls, which support part is fixed with an openable snap-on fixing means to the aforementioned body part.

10 Claims, 3 Drawing Sheets

(56) References Cited

U.S. PATENT DOCUMENTS

Figure 1:
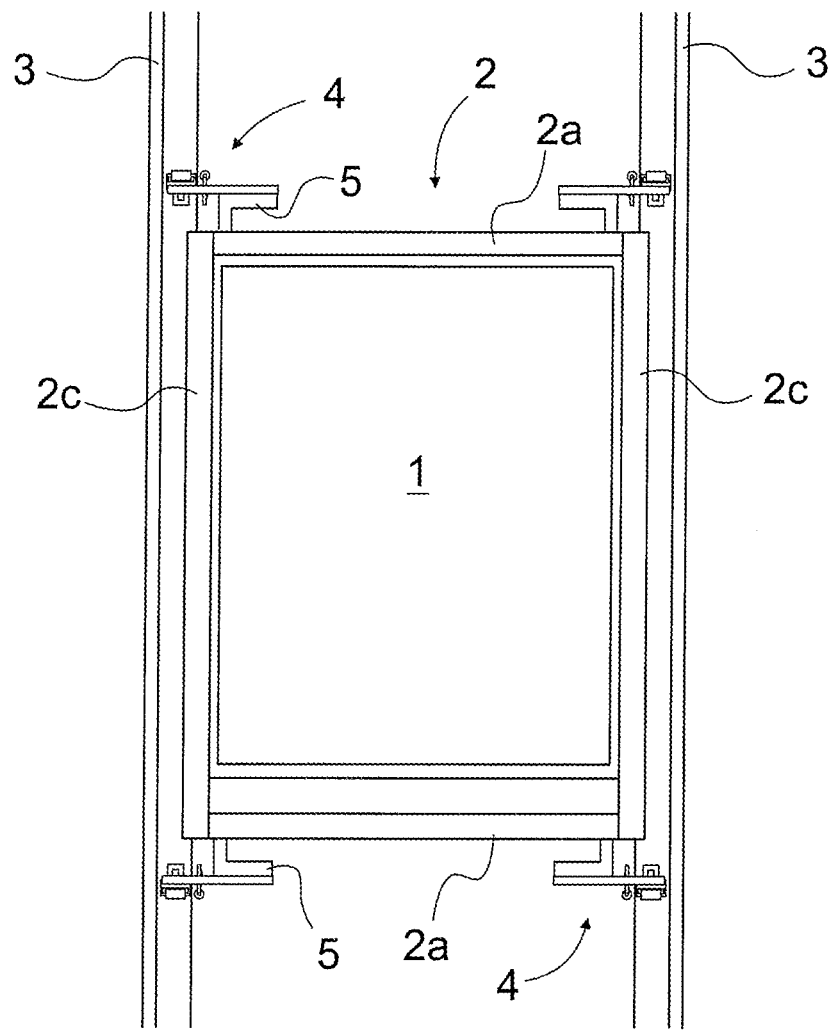

| | | | | | |
|---|---|---|---|---|---|
| 3,154,281 | A | * | 10/1964 | Frank | F16B 21/06 174/138 G |
| 4,716,991 | A | * | 1/1988 | Riechers | B66B 7/047 187/406 |
| 5,033,589 | A | | 7/1991 | Rhodes | |
| 5,117,946 | A | * | 6/1992 | Traktovenko | B66B 7/046 187/410 |
| 5,544,722 | A | * | 8/1996 | McKenzie | B23Q 1/262 187/406 |
| 6,050,370 | A | * | 4/2000 | Jung | B66B 7/048 187/409 |
| 6,345,698 | B1 | | 2/2002 | Ravishankar | |
| 6,846,125 | B2 | * | 1/2005 | Smith | F16B 2/20 24/293 |
| 7,258,204 | B2 | * | 8/2007 | Kurzo | B66B 7/048 187/409 |
| 7,415,752 | B2 | * | 8/2008 | De Azevedo | F16B 2/24 24/295 |
| 7,621,377 | B2 | * | 11/2009 | Husmann | B66B 7/042 187/292 |

OTHER PUBLICATIONS

Written Opinion PCT/ISA/237 for for PCT/FI2012/050258 dated Jun. 21, 2012.
Finnish Search Report for Finnish Application No. 20110118 dated Dec. 14, 2011.
Extended European Search Report dated Jul. 25, 2014 issued in corresponding European Application No. 12763792.4.

\* cited by examiner

ELEVATOR PROVIDED WITH A GUIDE SHOE ARRANGEMENT

This application is a continuation of PCT International Application No. PCT/FI2012/050258 which has an International filing date of Mar. 19, 2012, and which claims priority to Finnish patent application number 20110118 filed Mar. 30, 2011, the entire contents of both which are incorporated herein by reference.

The object of the invention is an elevator provided with a guide shoe arrangement.

In solutions according to prior art, the guide rolls of an elevator car are generally mounted via bearings directly onto a shared guide frame. One problem is that replacement of the guide rolls and inspection of their condition is difficult and slow. Often the whole guide shoe pack must be completely or partially disassembled for the purpose of replacement or inspection. Correspondingly, the installation and adjustment of new guide rolls is also slow and awkward, and requires precision.

U.S. Pat. No. 5,984,053 presents a number of prior-art roller guide solutions, which have, among others, exactly the drawbacks presented above. In addition, prior-art solutions are structurally large in size, which might cause problems in relation to the layout of an elevator.

The object of the present invention is to eliminate the above-mentioned drawbacks and achieve an elevator provided with an inexpensive and simple guide shoe arrangement, in which elevator each guide roll is easy to inspect, service or replace according to individual need independently of the other guide rolls. Another aim is to achieve an elevator provided with a guide shoe arrangement, in which elevator each guide roll can be quickly released from its locking and can also be quickly locked back into its position, and in which the locking shape-locks the support part of a guide roll accurately and firmly into its position. Additionally, another aim is to achieve an elevator provided with a guide shoe arrangement, in which elevator the structure of the roller guide shoe is light and of small size and, particularly in the lateral direction, extremely narrow.

Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment of the invention can also be applied in other embodiments. In addition it can be stated that at least some of the subordinate claims can in at least some situations be deemed to be inventive in their own right.

One advantage of the solution according to the invention is that the guide rolls can be replaced or inspected independently of each other, in which case the replacement or inspection is quick and easy. A detached guide roll can be inspected e.g. on the roof of the elevator car and if the guide roll is worn it can easily be replaced with a new guide roll plus support part, or the new guide roll can be placed into the old support part. Another advantage is the snap-on locking of the support parts of the guide rolls, which locking is easy and quick to open and to lock and in which the support part settles into its correct location, when locked, precisely and firmly without extra adjustments. Yet another advantage is the simplicity, lightness and small size of the structure. Particularly in the lateral direction the guide shoe construction is narrow, and does not take a lot of space from other devices of the elevator. In addition, the metal body part of a guide shoe structure is shaped such that when a guide roll possibly fails the body part nevertheless keeps the elevator car guided by the guide rail. A further advantage is that the solution is easy and inexpensive to implement.

Figure 2:
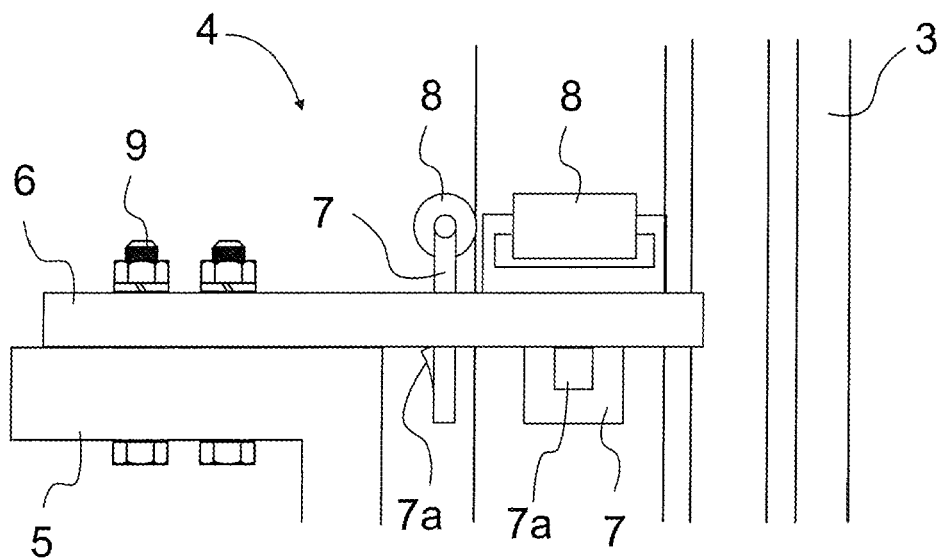
Figure 3:
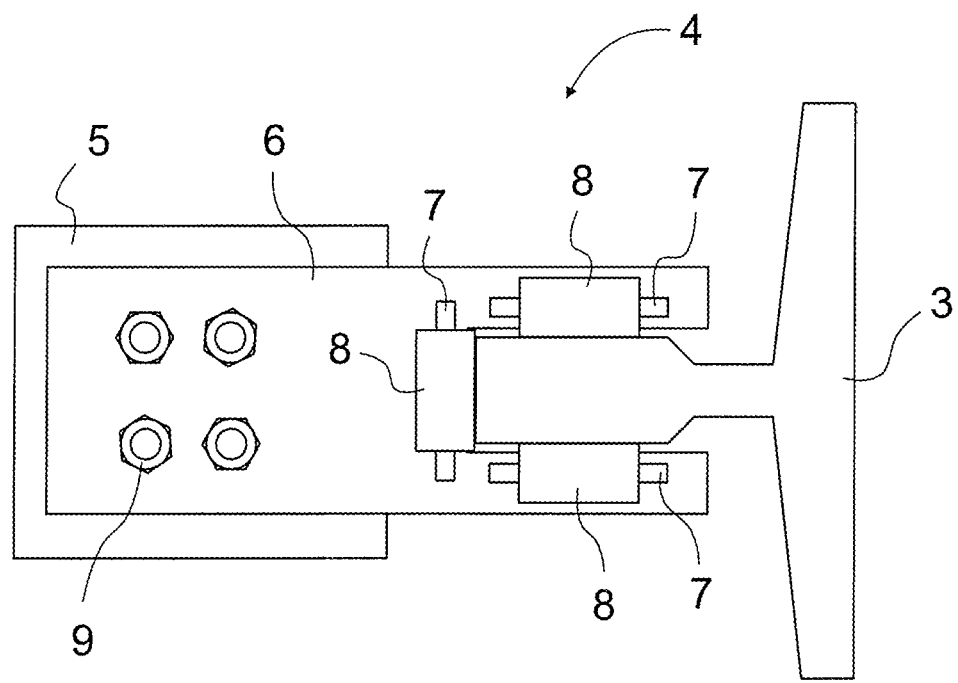
Figure 4:
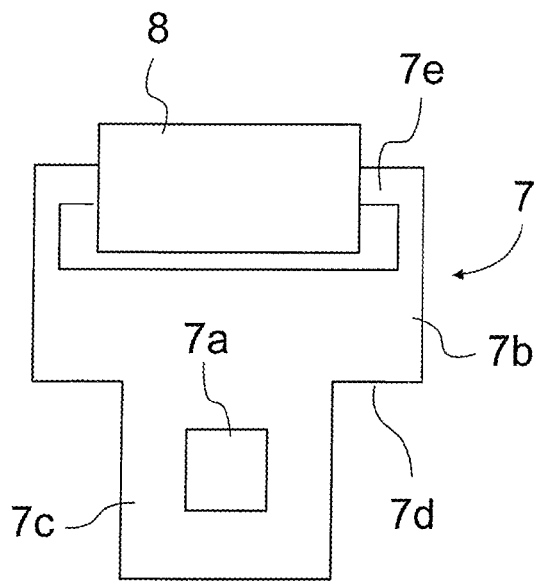
Figure 5:
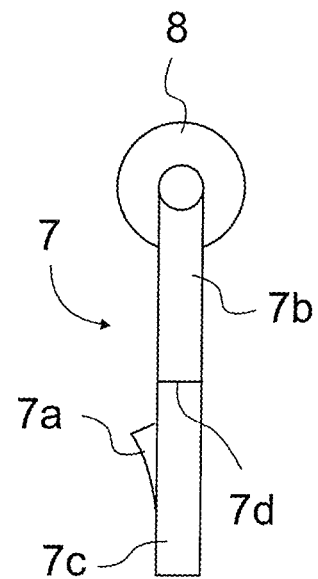
Figure 6:
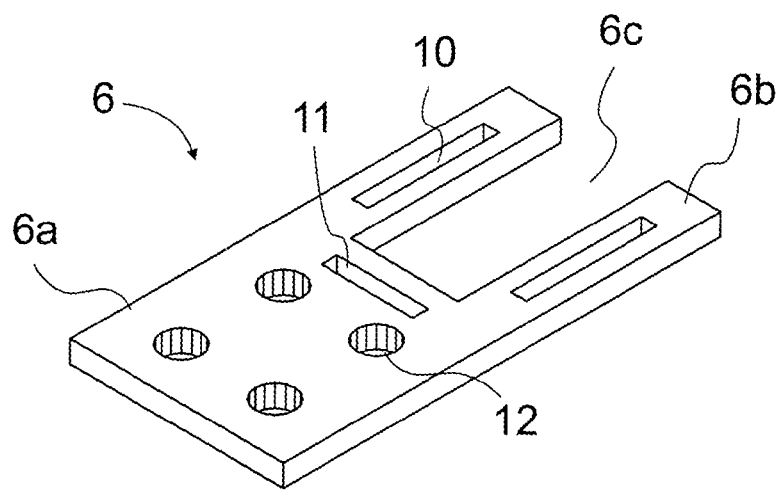

In the following, the invention will be described in more detail by the aid of an example of its embodiment with reference to the attached drawings, wherein FIG. 1 presents a simplified and diagrammatic front view of an elevator, in which the roller guide shoe arrangement according to the invention is used, FIG. 2 presents a more detailed simplified side view of a roller guide shoe arrangement of an elevator according to the invention, FIG. 3 presents a more detailed simplified top view of a roller guide shoe arrangement of an elevator according to the invention, FIG. 4 presents a more detailed simplified front view of a detached roller guide shoe, with its support parts, of an elevator according to the invention, FIG. 5 presents a more detailed simplified side view of a detached roller guide shoe, with its support parts, of an elevator according to the invention, and FIG. 6 presents a simplified and oblique top view of a detached guide shoe body of a roller guide shoe of an elevator according to the invention.

FIG. 1 presents a simplified and diagrammatic front view of part of one elevator, in which a guide shoe arrangement according to the invention is used. For the sake of clarity, many parts of the elevator have been omitted from FIG. 1, such as e.g. the hoisting machine and the hoisting roping with its rope pulleys. The elevator car 1 is disposed inside a car sling 2 and the car sling 2 is fitted to travel essentially vertically to and fro in the elevator hoistway guided by guide rails 3 at the sides of the elevator car 1. The car sling 2 comprises at least a top element 2a, a bottom element 2b and also two side elements, i.e. vertical elements 2c, which vertical elements 2c are disposed on those sides of the elevator car 1 where there are guide rails 3. In addition, on the top part and on the bottom part of the car sling 2 are two mountings 5 functioning as an adaptor part, to which the guide shoe elements 4 of the elevator car are fixed.

FIGS. 2 and 3 present a simplified and more detailed roller guide shoe arrangement of an elevator according to the invention. FIG. 2 presents the structure as viewed from the side, and FIG. 3 as viewed from the top. A guide shoe element 4 comprises at least a body part 6, via which the guide shoe element 4 is fixed to its base 5 on the car sling 2 by the aid of fixing means 9, such as screws and nuts. The body part 6 is also configured to support the support parts 7 of the roller guide shoes, which support parts are locked at their first end essentially immovably to the body part 6 by the aid of easily and quickly openable snap-on locking means 7a, such as flexible fixing claws or corresponding snap-on fasteners. In this case the fixing can also be called a snap-on joint, wherein the snap-on locking means 7a of the support part 7 and the detent surface, i.e. in the case according to the example the bottom surface, of the body part 6 form a detent pair. The snap-on joint thus formed locks the support part 7 to the body part 6 and prevents the free departure or the extraction e.g. by accident, of the support part 7.

There are e.g. three units of support parts 7 fixed to the body part 6, one on each side of the guide part of the guide rail 3 and one in front of the butt end of the guide part. A guide roll 8 is installed onto the second end of the support parts 7 so as to rotate on bearings, the diameter of which guide roll is preferably smaller than the length in the axial direction of the guide roll 8. The length of a guide roll 8 can be e.g. almost as large as the whole width of the guide surface of the guide rail 3. The guide rolls 8 being small in diameter and the simple snap-on locking of the support part 7 enable a small and narrow structure of the whole guide shoe element 4, which structure does not take up too great a space particularly in the lateral direction of the guide rail.

FIGS. 4 and 5 present a support part 7, with guide rolls and detached from the body part 6, of a guide shoe element 4. FIG. 4 presents the structure as viewed from the front, and FIG. 5 as viewed from the side. The support part 7 is e.g. a piece cut from metal plate, said piece being essentially of uniform thickness and symmetrical in the width direction, and having a first end 7c that is narrower in the width direction than the second end 7b, in which case an essentially planar support surface 7d remains between the side edges of the first end and the side edges of the second end, the width of which support surface is the same as the thickness of the support part 7 and the length of which is one-half of the width difference of the first end 7c and the second end 7b.

The second end 7b of the support part 7 also comprises arm parts 7e pointing towards the center line of the support part 7, onto which arm parts a guide roll 8 is installed so as to rotate on bearings. The bearings, which are e.g. slide bearings, are not presented in more detail in the figures. The slide bearings can be ceramic or antifriction metal. Since the diameter of a guide roll 8 is small, it is advantageous that the surface of the guide rolls 8 is of a material that is very durable against wear. Correspondingly, the core of a guide roll 8 is preferably soft and insulates against sound well.

Correspondingly, at the first end 7c of the support part 7 is an easily openable snap-on locking means 7a, by the aid of which the support part 7 is locked firmly to the surface of the body part 6 such that the support surfaces 7d of the support part 7 rest against the surface of the body part 6. The snap-on locking means 7a is e.g. a spring-like tongue or claw, which is rectangular in shape and attached at one of its sides to the support part 7 and at three of its sides is cut away from the support part 7. The side opposite the attached side is compelled by spring force to protrude from the side surface of the support part 7, as can be seen from FIG. 5. The snap-on locking means 7a can be any locking means whatsoever enabling a firm and strong locking and that can be easily locked and opened, e.g. some snap-on fastener according to prior art.

The structure of the support part 7 is preferably arranged to be spring-like in such a way that when it is in position locked to the body part 6, the second end 7b of the support part 7, said end being provided with a guide roll 8, presses by the aid of the spring force of the support part towards the guide surface of the guide rail 3. The dimensioning is made so that in this case the guide rolls 8 press the guide surfaces of the guide rail 3 lightly. The structure is implemented such that the support part 7 is arranged to bend (away from its state of rest, e.g. into a curve) forced by the guide roll 8 resting on the guide rail 3. The support part 7 in this case has prestressing for pressing the guide shoe roll 8 against the guide surface of the guide rail 3 without any clearance. The support part 7 forms a spring, which maintains contact with the guide surface of the guide rail 3 despite wearing of the guide shoe roll 8, and softens the transmission of the guiding force from the guide rail to the elevator car 1. In this way the spring-like support part 7 simultaneously functions as a damper.

FIG. 6 presents the guide shoe body, i.e. the body part 6 of a guide shoe element 4, of a roller guide shoe of an elevator according to the invention when the guide shoe body is detached. The body part 6 is e.g. a U-shaped piece cut from metal plate, said piece preferably being of essentially uniform thickness, the first end 6a of which piece comprises fixing holes 12 for fixing the body part to the mounting 5 on the car sling 2 by the aid of fixing means 9, such as screws and nuts. At the center of the second end of the body part 6 is an aperture 6c open at its second end, the width of which aperture is configured to be suitably larger than the thickness of the guide part of the guide rail 3. Correspondingly, the length of the aperture 6 is suitably greater than the width of the guide part of the guide rail 3 in the direction of the elevator car.

Both sides of the aperture 6 have prong-like edge parts 6b extending towards the second end of the body part, both of which edge parts comprise an essentially rectangular locking aperture 10 elongated in the direction of the edge part 6b. In addition, between the first end 6a of the body part 6 and the aperture 6, in front of the aperture, is a locking aperture 11 corresponding to the locking apertures 10, the length direction of which locking aperture 11 is at a right angle with respect to the length directions of the locking apertures 10. The locking apertures 10 and 11 can be the same size as each other, but if necessary the locking aperture 11 can also be shorter than the locking apertures 10. The shape and size of the locking apertures 10, 11 are configured to be essentially the same as the shape and size of the cross-section of the first end 7c of the support part 7. In this case the width and length of an aperture 10, 11 are essentially the same, or only so much greater than the thickness and length of the first end 7c of the support part 7 that the first end 7c of the support part 7 can, by pushing, be disposed in an aperture 10 or 11 and can be pulled out of it, and that the support part 7 disposed in an aperture 10 or 11 is immediately, without adjustments, positioned in its correct location and remains firmly in its location.

The distance between the protruding surface of the claw of the snap-on locking means 7a and the support surfaces 7d of the support part 7 is selected with respect to the thickness of the body part 6 such that the aforementioned distance is essentially the same as, or at least only a very little larger than, the thickness of the body part. In this case an advantageous structure of the snap-on locking means 7a is such that, when pressing a support part 7 into its position in an aperture 10 or 11 of the body part 6, the locking of the support part 7 to the body part 6 occurs automatically. Correspondingly, opening is performed by pressing the claw e.g. with a finger or using some small tool as a pressing means, and by pulling the support part 7 out of its position.

Characteristic to the solution according to the invention is, inter alia, that the apertures 10 and 11 in the body part 6 form a space, which owing to its shape and dimensions shape-locks the support part 7 firmly into its position already without the tightening effect of the snap-on locking means 7a, which finally locks the support part 7 into its position.

It is obvious to the person skilled in the art that different embodiments of the invention are not only limited to the examples described above, but that they may be varied within the scope of the claims presented below. Thus, for example, the structure of a guide shoe element can also be different than what is described above and the guide shoe elements can be fixed to the elevator car in a different manner.

Likewise it is obvious to the person skilled in the art that although the figures present pushing the support part of a guide roll into its position downwards from above, the pushing direction can be some other, e.g. upwards from below or sidewards. In addition, the pushing direction and pulling direction can also be inclined.

It is also obvious to the skilled person that the flexible snap-on locking means locking the support part to the body part can also be a protrusion-type claw or corresponding on the body part, and the mate for it can be an aperture in the support part, into which the claw or corresponding locks.

In addition, it is further obvious to the person skilled in the art that the guide rolls can differ to what is described above, e.g. be of larger diameter.

Instead of guide rolls, sliding pads that are fixed to the support part described above or to a support part corresponding to same, can be used.

The invention claimed is:

1. An elevator comprising:
    at least an elevator car configured to travel in an elevator hoistway guided by guide rails, and
    at least one guide shoe element including,
        a body part moving along with the elevator car, and
        a plurality of guide rolls supported on the body part via respective support parts, the support parts being metal plates having a width greater than a thickness thereof, each of the plurality of guide rolls configured to rotate while contacting a guide surface of a guide rail to guide the elevator car when the elevator car moves, the support parts being planar shaped and including a proximal end with a respective one of the plurality of guide rolls attached thereto, a distal end and middle portion therebetween, the distal end having the planar shape, the support parts including an openable snap-on fixing device protruding from a side surface of the middle portion such that, when the support parts penetrate slots in the body part from a first surface of the body part to fix a respective one of the support parts to the body part, the openable snap-on fixing device exits a second surface of the body such that the planar shaped distal end of the support parts extend below the openable snap-on fixing device and each of the support parts are attached to the body part via a respective one of the openable snap-on fixing devices and each of the plurality of guide rolls and support parts are removable from the body part by releasing the respective one of the openable snap-on fixing devices.

2. The elevator according to claim 1, wherein
    the plurality of guide rolls include guide rolls on a first and a second side of the guide rail, the first side being an opposite side of the guide rail from the second side, and
    each of the guide rolls is supported such that the guide rolls are rotatable on the support part.

3. The elevator according to claim 2, wherein the body part comprises:
    edge parts extending toward the first side and the second side of the guide rail, the edge parts including a first edge part having a first slot therein and a second edge part having a second slot therein, the distal end of the support part configured to penetrate and lock into a respective one of the first slot and the second slot, and the body part includes a third slot extending in length at a right angle with respect to the first slot and the second slot, a width and thickness of each of the first slot, the second slot and the third slot correspond to the width and thickness of the distal end of the support part.

4. The elevator according to claim 3, wherein the support part comprises:
    a support surface parallel to the first surface of the body part such that, when the support part penetrates the respective one of the first slot, the second slot and the third slot from the first surface, the support surface rests against the first surface of the body part and the respective one of the openable snap-on fixing device extends from the side surface to contact the second surface of the body part such that the distal end of the support part extends below the openable snap-on fixing device with respect to the guide roll.

5. The elevator according to claim 4, wherein when the support part is in position locked into the slot of the body part, the support surface is configured to rest against the surface of the body part and thus prevent the support part from further penetrating the body part.

6. The elevator according to claim 1, wherein the snap-on fixing device is a flexible fixing claws forming a snap-on joint between the support part and the body part.

7. The elevator according to claim 6, wherein
    the support part and the body part form a detent pair, in which the flexible fixing claw is on the support part and the second surface of the body part locks the support part on the body part.

8. The elevator according to claim 7, wherein
    When the support part is position locked into one of the slots of the body part, the flexible fixing claws is configured to extend to mate the support part and the body part to prevent extraction of the support part from the slot, and
    the flexible fixing claws is configured to retract to enable extraction of the support part from one of the slots.

9. The elevator according to claim 1, wherein the support part is configured to generate a spring force such that, when the support part is locked into the body part via the openable snap-on fixing device, the proximal end of the support part presses via the spring force towards the guide surface of the guide rail to compress the guide roll against the guide surface of the guide rail.

10. A guide shoe comprising:
    a body moving along with an elevator car; and
    supports having a planar shape and including a proximal end, a distal end and a middle portion therebetween, the proximal end of the supports having guide rolls attached thereto, the supports being metal plates having a width greater than a thickness thereof, the guide rolls configured to rotate while contacting a guide surface of a guide rail to guide the elevator car when the elevator car moves, the supports being fixed to the body via openable snap-on fixing devices protruding from a side surface of the middle portion of the supports, the supports configured to penetrate slots in the body, the slots having a width and thickness corresponding to the width and thickness of the supports such that, when the supports penetrate the slots from a first surface of the body, the respective one of the openable snap-on fixing device exits a second surface of the body such that the planar distal end of the supports extend below the openable snap-on fixing devices.

* * * * *